Patented Oct. 2, 1928.

1,686,391

UNITED STATES PATENT OFFICE.

CARL MÜLLER, OF MANNHEIM, AND LEO SCHLECHT AND WALTER SCHUBARDT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS OF PRECIPITATING HEAVY METALS FROM AMMONIACAL SOLUTIONS.

No Drawing. Application filed March 11, 1927, Serial No. 174,696, and in Germany April 9, 1926.

In order to precipitate the metal or metals (as such or as compounds thereof) from ammoniacal solutions of salts or oxids of heavy metals, such as solutions of copper salts, it has hitherto been the practice to subject these solutions, in a suitably diluted condition, to electrolysis, or to treat them with precipitants. The precipitation of the metal or metals has also been effected by more or less completely expelling the ammonia, by heating or concentrating the solutions, in which event, for example from ammoniacal solutions of copper salts, cupric oxid or a basic copper salt was thrown down. It has also been proposed to reduce ammoniacal solutions of copper salts with sulfurous acid, and thereby to precipitate the copper as a difficultly soluble compound. All these processes, however, are attended with the drawback that the residual solution, freed from the metal or metals, is not obtained directly in its original composition, but must be regenerated, either by cencentration or by still more complicated methods. However, the hitherto impracticable simple recovery of the ammonia:al solution in an as far as possible unaltered state of concentration is a deciding factor for the economical performance of a number of processes, such for example as the leaching of copper from low-grade copper ores.

We have now found that heavy metals may be precipitated completely or substantially completely as such, or in the form of insoluble compounds, from ammoniacal solutions of heavy-metal compounds in a simple manner by treating the solutions with reducing gases, that means the chief constituents of water gas, namely carbon monoxid or hydrogen, or mixtures of these gases or gases containing the same, at an elevated temperature and under pressure. This treatment furnishes a residual solution containing free ammonia and directly suitable for use over again for example in leaching ores. The temperature and pressure are chosen according to the nature of the metal or metals to be precipitated and to the concentration of the solution to be treated. The more dilute the solution, the lower is the temperature and pressure at which the metal or metals may be completely precipitated. The process according to the present invention is applicable for the precipitation of all metals which furnish soluble compounds with ammonia, as for example: silver, copper, nickel, cobalt or zinc, and the nobler the metal, the lower is the pressure and temperature required for precipitation. In the case of dilute ammoniacal solutions of silver salts it is even possible to obtain complete precipitation, for example by carbon monoxid, at ordinary, or slightly elevated temperature and raised pressure, or at elevated temperature and atmospheric pressure. Consequently, by applying a low pressure or temperature at first, and increased pressure or temperature subsequently, it is possible to precipitate, and thereby separate, in succession a number of metals contained in one and the same solution. According to the duration of treatment, the pressure and working temperature employed, the resulting precipitate will consist either of metal, or oxid, or basic salt, the latter being generally of the lowest stage of oxidation.

The said process is preferably carried out in a pressure apparatus in which the solution and the gas can be moved or mixed together, as for example by a stirring or agitating device. The inner wall of the pressure vessel is lined with a material capable of resisting the action of the ammoniacal solution and also that of the gas. Thus, for example, in operating with gases containing carbon monoxid, it is preferable to employ an autoclave lined with lead, in order to prevent the formation of metal carbonyl.

The said process is of particular importance for the recovery of copper from ammoniacal solutions, such as are obtained in leaching copper schists, since, in this case, the copper can be precipitated, in a simple manner, separately from the other metals present in the solution, and the residual solution can be used again without further treatment.

The following example will further illustrate how the said invention may be carried into practical effect but the invention is not limited to this example.

An ammoniacal solution containing 0.04 gramme of silver and 6 grammes of copper per litre is first treated for 3 hours with water gas at 50° C. and under a pressure of 130 atmospheres. This throws down the whole of the silver as a spongy, grey precipitate, free from copper, and separable by filtration. The filtrate free from silver and containing most of the copper in the state of cuprous compounds is then treated again with water gas, but at 200° C. and under a pressure of 130 atmospheres, for 3 hours, by which means 95.3 per cent of the copper present in the solution is thrown down in the form of a pale red metallic powder containing 98.5 per cent of copper.

We claim:

1. The process of precipitating heavy metals from ammoniacal solutions of heavy metal compounds which consists in treating the solution with a reducing gas under elevated pressure and at an elevated temperature so as to effect a substantially complete separation of the heavy metals.

2. The process of precipitating heavy metals from ammoniacal solutions of heavy metal compounds which consists in treating the solution with a reducing gas first at moderately elevated pressure and temperature and subsequently at more elevated pressure and temperature, so as to effect a separate precipitation of several metals contained in the solution.

3. The process of precipitating noble and other heavy metals from ammoniacal solutions of noble and other heavy metal compounds which consists in precipitating the noble metals from the solution by treatment with a reducing gas at a pressure and temperature, of which at least one is elevated with regard to room conditions, removing the metal so precipitated and then treating the solution containing the less noble metal with a reducing gas at elevated pressure and elevated temperature at least one of which is more elevated than was necessary for precipitation of the nobler metal.

4. The process of precipitating copper from ammoniacal solutions of copper compounds which consists in treating the solution with a reducing gas under elevated pressure and at an elevated temperature so as to effect a substantially complete separation of the copper.

5. The process of precipitating noble metals and other heavy metals from an ammoniacal solution containing them as a mixture which consists in subjecting such solution to several treatments with a reducing gas at elevated temperature and pressure at least one of which conditions varies with each treatment being higher the less noble the metal to be precipitated.

6. The process of precipitating silver and copper from an ammoniacal solution containing .04 grams of silver and 6 grams of copper per litre which consists in treating such solution with water gas at about 50° C. and under a pressure approximating 130 atmospheres whereby the silver is precipitated, removing the silver so precipitated, and then treating the remaining solution with water gas at about 200° C. and under the aforesaid pressure whereby the copper is precipitated, the temperature in any case varying with the amount of metal in solution being greater the greater the amount of metal in solution.

In testimony whereof we have hereunto set our hands.

CARL MÜLLER.
LEO SCHLECHT.
WALTER SCHUBARDT.